US012320481B2

(12) United States Patent
Chiron et al.

(10) Patent No.: US 12,320,481 B2
(45) Date of Patent: Jun. 3, 2025

(54) LIGHT MODULE INTENDED FOR BEING ATTACHED TO A LIGHT DEVICE OF A MOTOR VEHICLE

(71) Applicant: VALEO VISION, Bobigny (FR)

(72) Inventors: Jerome Chiron, Angers (FR); Florent Baudouin, Bobigny (FR); Pascal Garin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/291,081

(22) PCT Filed: Aug. 1, 2022

(86) PCT No.: PCT/EP2022/071512
§ 371 (c)(1),
(2) Date: Jan. 22, 2024

(87) PCT Pub. No.: WO2023/012090
PCT Pub. Date: Feb. 9, 2023

(65) Prior Publication Data
US 2024/0360968 A1 Oct. 31, 2024

(30) Foreign Application Priority Data
Aug. 4, 2021 (FR) ..................................... 21 08496

(51) Int. Cl.
*F21S 45/49* (2018.01)
*F21S 41/19* (2018.01)

(52) U.S. Cl.
CPC ............. *F21S 41/192* (2018.01); *F21S 45/49* (2018.01)

(58) Field of Classification Search
CPC ................................ F21S 41/192; F21S 45/49
USPC .......................................................... 362/487
See application file for complete search history.

(56) References Cited

U.S. PATENT DOCUMENTS

2013/0070471 A1 3/2013 Pickholz
2015/0211721 A1 7/2015 Mornet et al.
2021/0310628 A1* 10/2021 Li ......................... F21S 41/285
2022/0163178 A1* 5/2022 Di Sopra ............ B29C 65/1635

FOREIGN PATENT DOCUMENTS

DE 20 2013 100 903 U1 5/2013
FR 2 994 788 A1 2/2014
JP 2010-67556 A 3/2010
JP 2012-119260 A 6/2012
(Continued)

OTHER PUBLICATIONS

French International Search Report issued Oct. 6, 2022 in PCT/EP2022/071512 filed on Aug. 1, 2022, 5 pages (with English Translation).
(Continued)

*Primary Examiner* — Christopher M Raabe
(74) *Attorney, Agent, or Firm* — Oblon, McClelland, Maier & Neustadt, L.L.P.

(57) ABSTRACT

A luminous module intended to be fastened to a luminous device of a motor vehicle. The luminous module includes at least one first attachment mechanism configured to fasten the luminous module to the luminous device in a first direction and a second attachment mechanism configured to fasten the luminous module to the luminous device in a second direction that differs from the first direction.

15 Claims, 8 Drawing Sheets

(56) References Cited

FOREIGN PATENT DOCUMENTS

| | | | |
|---|---|---|---|
| JP | 2021-523856 | * | 9/2021 |
| KR | 20-2010-0007316 U | | 7/2010 |

OTHER PUBLICATIONS

French Preliminary Search Report issued Apr. 4, 2022 in French Application 21 08496 filed on Aug. 4, 2021, 3 pages (with English Translation of Categories of Cited Documents).

* cited by examiner

LIGHT MODULE INTENDED FOR BEING ATTACHED TO A LIGHT DEVICE OF A MOTOR VEHICLE

The present invention relates to the field of lighting and/or of light-based signaling, such functions being performed by motor vehicles, and it relates more particularly to the luminous modules able to carry out these functions and the means for fastening these luminous modules to the vehicles.

This field of lighting and/or of light-based signaling for motor vehicles is subject to a regulation which requires that each motor vehicle be able to carry out lighting and/or signaling functions that comply with specific safety standards, and notably a high-beam lighting function and a low-beam lighting function. The low-beam function allows a motor vehicle to be seen by other users and allows its driver to adequately see up to 30 meters of the roadway, without dazzling users present on the road. The high-beam function emits more intense light beams such that the driver of the motor vehicle can adequately see up to at least 100 meters of the roadway in nighttime conditions.

These low-beam and high-beam functions can be implemented by luminous modules, which are incorporated in luminous devices disposed at the front end of the motor vehicles. Such luminous modules notably comprise a light source, which can for example take the form of light-emitting diodes emitting a light beam. These light-emitting diodes are fitted on at least one printed circuit board, which is generally disposed on a support such as a radiator incorporated in the luminous module. This printed circuit board is covered by an optical element such as a reflector, which has the function of reflecting the light beams emitted by the light-emitting diodes in order to combine them and orient them toward a lens according to a predetermined distribution. A printed circuit board, light-emitting diodes borne by this printed circuit board and a reflector form a luminous sub-assembly.

A luminous device may comprise two luminous modules each provided with a luminous sub-assembly, the luminous modules being configured to respectively implement a low-beam function or a high-beam function. Provision may also be made for a luminous module to be equipped with two luminous sub-assemblies disposed on either side of a single support and respectively configured to direct the emitted and deflected light rays in the direction of a common lens, each sub-assembly being dedicated to the implementation of all or part of a lighting and/or light-based signaling function.

The luminous modules are fastened to the housings of the luminous devices by way of a fastening plate, which forms a movable interface that is adjustable in position and that is disposed between the luminous module and the housing fastened to the structure of the vehicle. A luminous module is thus equipped with attachment means which allow this luminous module to be fastened to the fastening plate by screwing. During a replacement of the luminous module, in the event of defective operation of one of the components for example, notably the light source, manufacturers desire to be able to replace this component. For problems of accessibility to the component to be replaced, it is sometimes necessary to remove the luminous module. Depending on the space around luminous device, it may be desired that the defective luminous module and the replacement luminous module be moved horizontally or vertically with respect to the fastening plate.

The present invention falls within this context by proposing an interchangeable luminous module, that is to say which is able to be assembled with a luminous device in two different fastening directions. Such a luminous module can thus be mounted in a vertical direction and in a longitudinal direction, depending on the direction which facilitates its removal and therefore its replacement.

A subject of the present invention thus relates to a luminous module of a motor vehicle intended to be fastened to a luminous device of a motor vehicle. According to the invention, the luminous module comprises at least one first attachment means configured to fasten the luminous module to the luminous device in a first direction and a second attachment means configured to fasten the luminous module to the luminous device in a second direction that differs from the first direction.

Such a luminous module can thus be fastened to the luminous device in two different directions. Such a fastening can notably be effected by way of a plate, which is a part connected to the luminous device by adjustable means that make it possible to adjust the position of the luminous module, and more particularly to adjust the orientation of the luminous module. These adjustable means notably make it possible, by modifying the orientation of the plate, to modify the orientation of the luminous module borne by the plate and therefore the orientation of the light beams emitted by this luminous module.

To this end, the luminous module may comprise a single plate, which has first means able to cooperate with the attachment means in the first direction and second means able to cooperate with the attachment means in the second direction. Alternatively, the luminous module may be equipped with two separate plates, one of these plates being selected depending on the desired attachment direction and therefore depending on the implemented attachment means.

The fastening alternative resulting from the presence of two different types of attachment means notably makes it possible to meet size constraints, but also mounting recommendations issued by automotive manufacturers.

According to one feature of the invention, the first attachment means and the second attachment means are used alternately to fasten the luminous module to the luminous device. In other words, the first attachment means and the second attachment means are not used simultaneously to fasten the luminous module to the luminous device. Thus, either the first attachment means is used to fasten the luminous module to the luminous device or the second attachment means is used to fasten the luminous module to the luminous device. The choice between the first attachment means and the second attachment means is made depending on the desired fastening direction of the luminous module.

According to one feature of the invention, the first direction is perpendicular to the second direction.

According to one feature of the invention, the first direction is a vertical direction perpendicular to the ground on which the motor vehicle is disposed. The fastening in the vertical direction may notably be preferred since it allows the module to rest on the plate, this being advantageous in accordance with isostatic considerations.

According to one feature of the invention, the second direction is a longitudinal direction corresponding to the main direction of elongation of the motor vehicle. This main direction of elongation of the motor vehicle equipped with the luminous module according to the invention also corresponds to a running direction or direction of forward movement of this vehicle. The fastening in the longitudinal direction has advantages notably for the removal and replacement of the luminous module. It can resolve the problems of accessibility posed by a fastening in the vertical direction, in which components may impede the removal.

According to another feature, the luminous module comprises at least three first attachment means and/or at least three second attachment means, at least two of the first attachment means and/or two of the second attachment means each being disposed in opposition in the vicinity of one of the transverse or vertical ends of the luminous module.

A configuration with three attachment means, which are disposed transversely on either side of the luminous module, ensures the isostatism of the luminous module. It is also possible to envision an alternative embodiment with four first attachment means and/or four second attachment means, which makes it possible to limit the vibrations and the cantilever stresses.

Transverse ends are understood to mean the ends of the luminous module in a transverse direction which extends perpendicularly with respect to both the first direction and the second direction. Such an arrangement of the attachment means also makes it possible to provide access to different parts of the luminous module.

According to one feature of the invention, a single part of the luminous module is configured to comprise the least one first attachment means and the at least one second attachment means.

For example, said single part may be a radiator, notably formed from aluminum.

Additionally or alternatively, said single part forms a support for at least some of the parts making up the luminous module, notably for a luminous sub-assembly.

It is advantageous for the support and/or the radiator to be used to support the attachment means since this part is more solid than other components of the luminous module.

Alternatively, the first attachment means is disposed on a first part of the luminous module and the second attachment means is disposed on a second part of the luminous module, different from the first part. In this scenario, the first part could be the support and the second part an optical element, for example a reflector.

According to another feature, one of the first attachment means and the second attachment means is formed by a screw bushing, able to receive a clamping screw, and the other is formed by a pierced wall intended to be pressed against a screw bushing by way of a head of the clamping screw. The screw bushing may be a tapped bushing or alternatively a bushing whose thread is formed upon insertion of a self-tapping screw.

According to one feature of the invention, the pierced wall forming one of the attachment means comprises a slot opening out onto end edge of said pierced wall. This particular form of the attachment means facilitates the removal of the mold or molds during the operation for molding the support, which is injection-molded in one piece.

The invention furthermore relates to a luminous device of a motor vehicle, comprising a luminous module as described above and a fastening plate, the luminous module being fastened to the luminous device by way of the fastening plate and at least one of its attachment means.

According to another feature, the luminous module is fastened to the luminous device by way of the fastening plate and one of the first and second attachment means, and an additional part is attached to the luminous module by the other one of the first and second attachment means.

Additional part should be understood to mean any part other than the fastening plate, this additional part also being able to be a reflector, a radiator or a fan, without this list being exhaustive, or an intermediate support part configured to support at least one reflector, a radiator or a fan. It will be understood that this additional part is attached to the luminous module by the attachment means which is not used for fastening said module to the luminous device. Thus, one of the two attachment means is used for fastening the module to the plate, and the other attachment means participates in the fastening of the additional part.

The features, variants and different embodiments of the invention may be combined with one another, in various combinations, as long as they are not mutually incompatible or mutually exclusive. It will be possible, in particular, to conceive of variants of the invention that comprise only a selection of the features described hereinafter, in isolation from the other features described, if this selection of features is sufficient to confer a technical advantage and/or to distinguish the invention from the prior art.

Further features, details and advantages of the invention will become more clearly apparent from reading the following description, and from studying an exemplary embodiment given by way of non-limiting indication, with reference to the appended drawings, in which.

Figure 1:
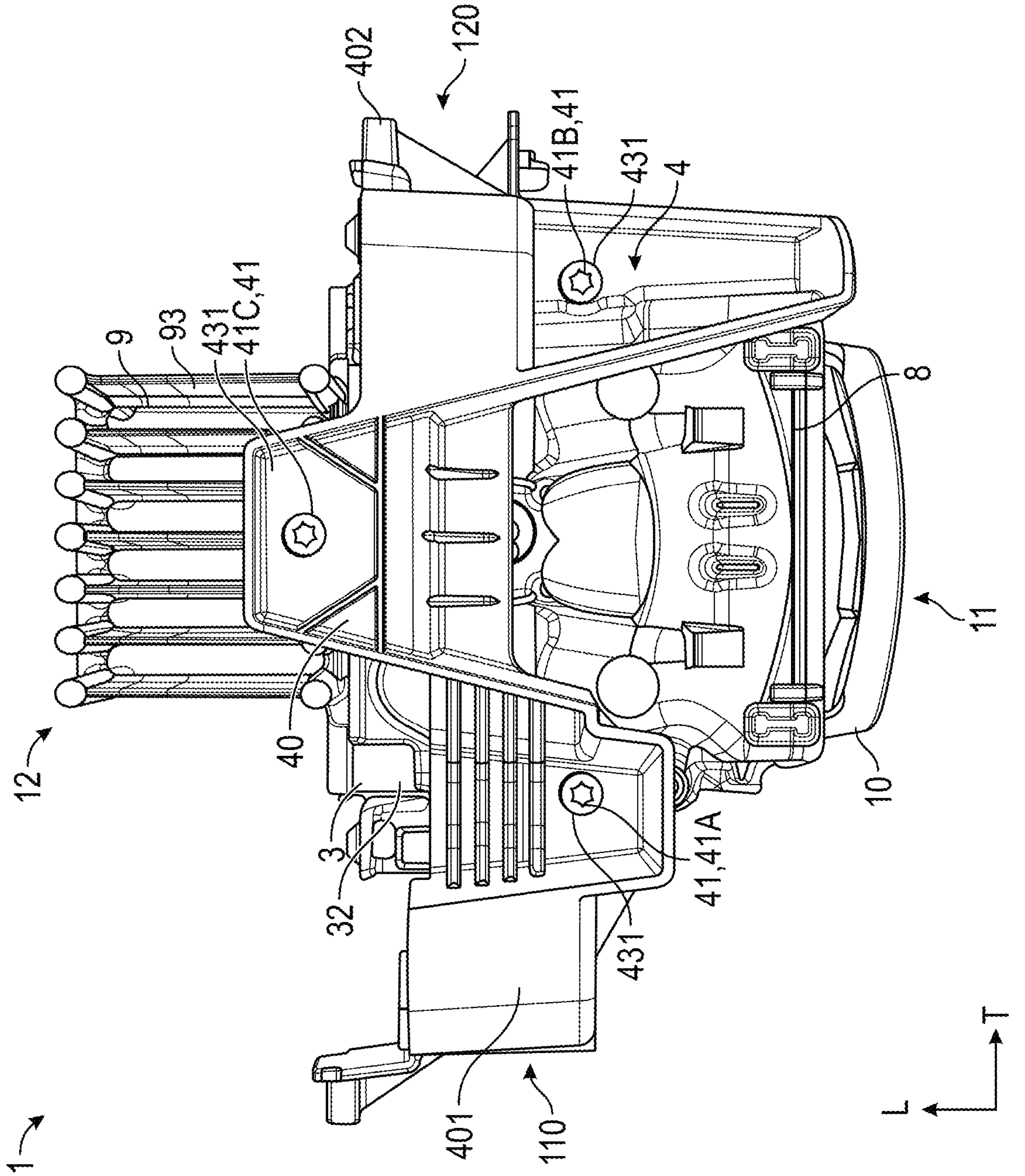
FIG. 1 is a bottom view of a first embodiment of a luminous module according to the invention and of a fastening plate of a first type, FIG. 1 notably rendering visible the means for attaching the luminous module in a first direction.

In the figures, elements that are common to multiple figures retain the same reference sign.

In the following detailed description, the terms "longitudinal", "transverse" and "vertical" refer to the orientation of the luminous module according to the invention. A longitudinal direction corresponds to a main direction of elongation of the motor vehicle comprising this luminous module, this longitudinal direction being parallel to a longitudinal axis L of a reference frame L, V, T illustrated in the figures. A vertical direction corresponds to a direction perpendicular to the ground on which the motor vehicle is disposed, this vertical direction being parallel to a vertical axis V of the reference frame L, V, T and this vertical axis being perpendicular to the longitudinal axis L. Lastly, a transverse direction corresponds to a direction parallel to a transverse axis T of the reference frame L, V, T, this transverse axis T being perpendicular to the longitudinal axis L and to the vertical axis V.

Furthermore, the terms “lower” and “upper” relating to the components of the luminous module are to be understood relative to the positioning of these components with respect to the support of the luminous module, an upper component being disposed with regard to the upper face of the support bearing the first reflector, whereas a lower component is disposed with regard to the lower face of this support bearing the second reflector.

A luminous module 1 will be described here as comprising two luminous sub-assemblies, each of these luminous sub-assemblies corresponding to a particular lighting function and/or a particular light-based signaling function. However, it will be understood that the following description is also intended to apply, mutatis mutandis, to any type of luminous module, and notably a luminous module that would have only one luminous sub-assembly or that would have more than two sub-assemblies.

The luminous module 1 according to the invention extends primarily in a longitudinal direction, which corresponds to the direction of elongation of the motor vehicle that it is intended to equip. As has been mentioned, the luminous module 1 is in this case more particularly a module with a double light function, that is to say a module comprising a support 3 on either side of which two sub-assemblies S1, S2 configured to emit light beams that differ from one another are arranged.

Each sub-assembly S1, S2 is configured to direct light rays in the direction of a lens 10 which participates in forming a regulatory light beam. The luminous module 1 further comprises a radiator 9, the fins 93 of which extend, primarily in the longitudinal and vertical directions, to a second longitudinal end 12, opposite a first longitudinal end 11, of the luminous module 1, in order to discharge the heat energy induced by the operation of the light sources.

The radiator 9 and the support 3 in this case form a common, integral part. The support 3 thus comprises a substantially planar portion that the fins 93 of the radiator 9 tend to extend to the second longitudinal end 12. The substantially planar portion of the support 3 forms a zone for receiving printed circuit boards of each of the sub-assemblies S1, S2. And in this receiving zone, the support 3 has a first face 31 and a second face 32, these faces 31 and 32 being opposite in the vertical direction.

Each sub-assembly S1, S2 comprises at least one printed circuit board, one or more light sources and a reflector configured to deflect the rays emitted by the light sources in the direction of the lens 10. More particularly, a first sub-assembly S1 comprises a first printed circuit board, fastened to the first face 31 of the support 3, and first light sources fastened to the first printed circuit board and a first reflector 7 which is disposed depending on the position of the light sources and which is configured to deflect the light rays emitted by the light sources in the direction of the lens 10. On the other side of the support 3, a second sub-assembly S2 comprises a second printed circuit board, second light sources fastened to the second printed circuit board and a second reflector 8 which is disposed depending on the position of the light sources and which is configured to deflect the light rays emitted by the light sources in the direction of the lens 10, which is in this case common to the two sub-assemblies. In the illustrated example, the first sub-assembly is configured to produce a first light beam which meets a low-beam lighting function, whereas the second sub-assembly is configured to produce a second light beam which, in combination with the first light beam, participates in producing a high-beam lighting function.

Figure 4:
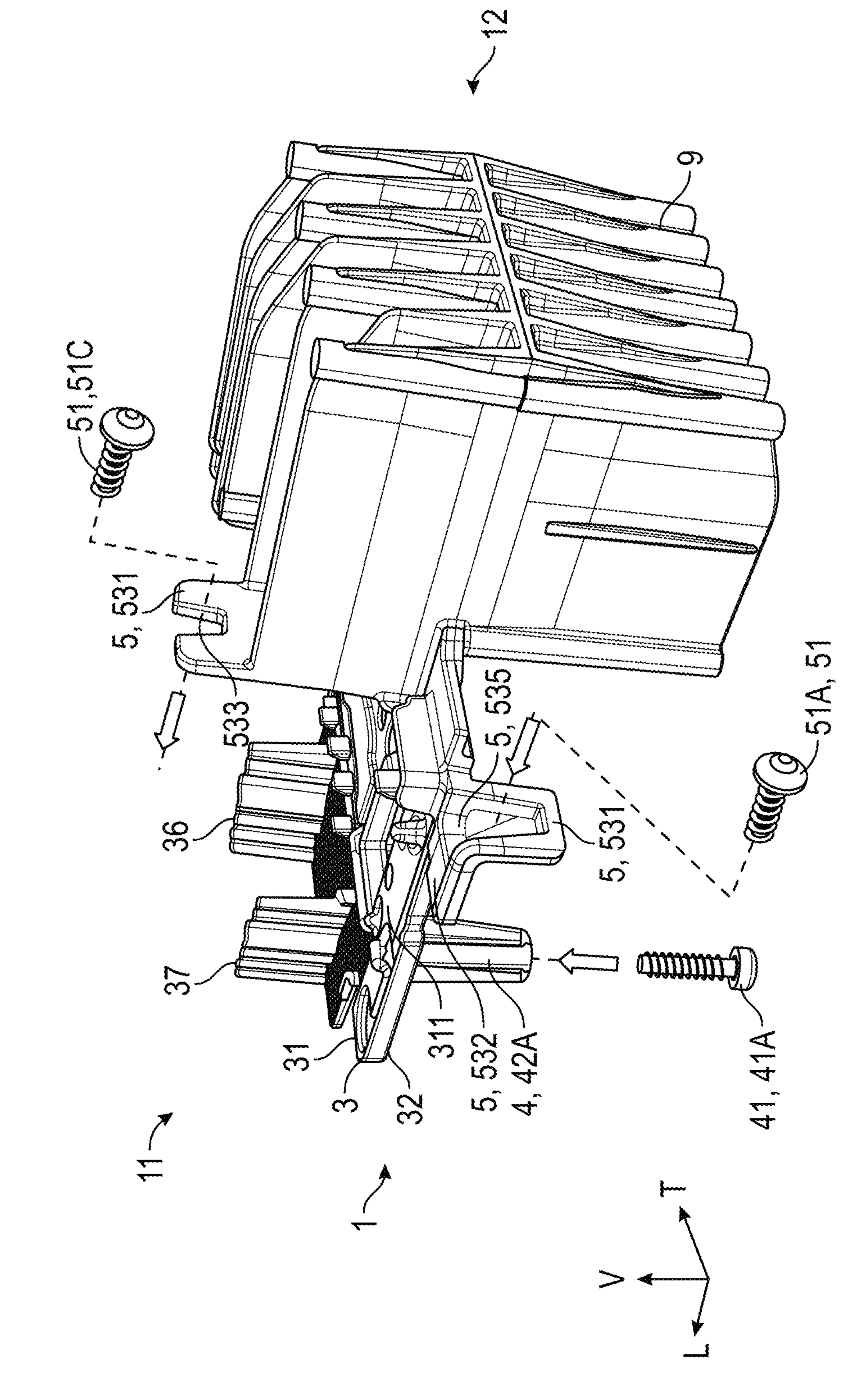
FIG. 4 is a view of the luminous module in FIG. 1, from the same perspective angle as that in FIGS. 2 and 3, without the fastening plate, in order to more particularly render visible the different attachment means borne by a support of the luminous module.
Figure 5:
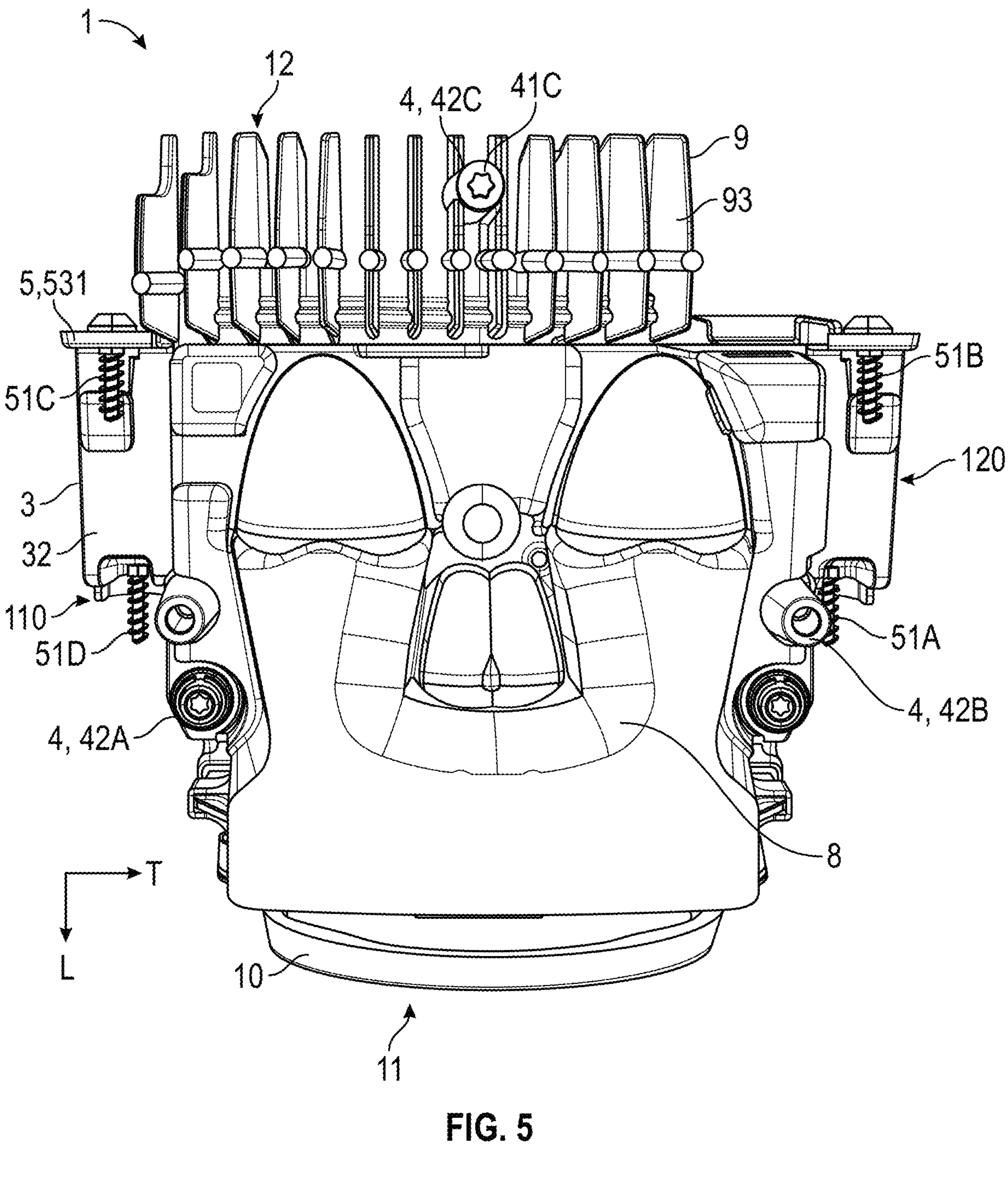
FIG. 5 is a bottom view of a second embodiment of a luminous module according to the invention, in this case without an associated fastening plate, and in which means for attachment in the first direction and means for attachment in the second direction are visible.

In the vicinity of the first longitudinal end 11, the support 3 comprises an upper low wall on its upper face 31, and two lower low walls 36, 37, visible in FIG. 4, on its lower face 32. These low walls extend in the longitudinal direction perpendicularly with respect to that portion of the support 3 which supports them and participate in guiding and dividing the light rays in the direction of the lens 10, not visible here, according to a predetermined distribution.

According to the invention, the luminous module 1 comprises at least one first attachment means 4 configured to fasten the luminous module 1 within a luminous device in a first direction V, which corresponds in this case to the vertical direction, and at least one second attachment means 5 configured to fasten the luminous module 1 within a luminous device in a second direction L, which corresponds in this case to the longitudinal direction. The first direction V and the second direction L which define the orientations of each of the attachment means 4, 5 fitted on the luminous module 1 according to the invention may be perpendicular with respect one another.

The first direction V is perpendicular to the ground on which the motor vehicle equipped with the luminous module 1 is disposed, whereas the second direction L corresponds to the direction of elongation of this motor vehicle, which also corresponds to its direction of forward movement.

FIGS. 1 to 4 more particularly illustrate a first embodiment of the luminous module 1 according to the invention, and FIGS. 5 to 8 illustrate a second embodiment of this luminous module according to the invention, the two embodiments differing from one another notably by the shape of the at least one second attachment means 5. In these embodiments, a description will notably be given of a luminous module with several first attachment means and several second attachment means, it being understood that the invention aims to cover a luminous module equipped with at least one first attachment means configured for an attachment of the luminous module in a direction that differs from the direction allowed by at least one second attachment means, independently of the number of attachment means.

It is notable that according to the invention, regardless of the shapes given to the first attachment means 4 and to the second attachment means 5, these two types of attachment means are permanently present on the luminous module 1 and are able to be implemented selectively depending on the configuration of the luminous device and of the motor vehicle in which the luminous module 1 is incorporated.

In what will be described below, the two types of attachment means are formed on a single part, in this case the support 3, an end portion of which is extended by the fins 93 of the radiator 9. However, alternatives in which these attachment means 4, 5 are disposed on different parts from one another, for example on the support 3 for the first attachment means 4 and on one of the reflectors 8 or 9 for the second attachment means 5, could be envisioned.

When it equips a motor vehicle, the luminous module 1 is fastened to the luminous device by way of a fastening plate. It will thus be understood that such a fastening plate is an interface disposed between the luminous module 1 and the housing of the luminous device intended to be fixed and secured to the structure of the vehicle. The luminous module 1 is mounted vertically or horizontally on the plate forming the interface.

In the embodiments which will be described below, the different attachment means 4, 5 of the luminous module 1 are intended to cooperate respectively with a fastening plate specific to each attachment means. The fastening plate is thus different depending on the mounting direction wanted to be provided for the luminous module 1 during these replacement operations. However, it should be noted that according to the invention it would be possible to make provision of a fastening plate which is common to the two attachment means 4, 5 fitted on the luminous module 1, which would comprise both means complementary to the first attachment means 4 and means complementary to the second attachment means 5.

In the case of fastening plates specific to each attachment means, the luminous device will be able to be equipped with a fastening plate of a first type, namely a vertical fastening plate 40, which offers a vertical movement stop for the luminous module 1 and which is able to cooperate with the first attachment means 4, in the first fastening direction V, if it is desired to be able to perform the removal of the defective luminous module and the provision of the replacing luminous module in the vertical direction. And the first attachment means 4 will then be used to cooperate with this fastening plate of a first type 40.

Alternatively, the luminous device will be able to be equipped with a fastening plate of a second type, namely a longitudinal fastening plate 50, which offers a longitudinal movement stop for the luminous module 1 and which is able to cooperate with the second attachment means 5, in the second fastening direction L, if it is desired to be able to perform the removal of the defective luminous module and the provision of the replacing luminous module in the longitudinal direction. And the second attachment means 5 will then be used to cooperate with this fastening plate of a second type 50.

The first attachment means 4 and the second attachment means 5, which are fitted on the same luminous module, may thus be used alternately to fasten the luminous module 1 to the luminous device, depending on the selected fastening direction.

According to an additional feature not shown here, the attachment means which are not used to fasten the luminous module 1 to the housing of the luminous device via the corresponding plate may be used to attach an additional part to this luminous module 1, this additional part being, for example, a reflector, a radiator or a fan, without this list being exhaustive. It would thus be possible to envision fastening the luminous module 1 to the luminous device using the first attachment means 4, whereas the second attachment means 5 would be used to fasten one of the reflectors 7 or 8.

Figure 8:
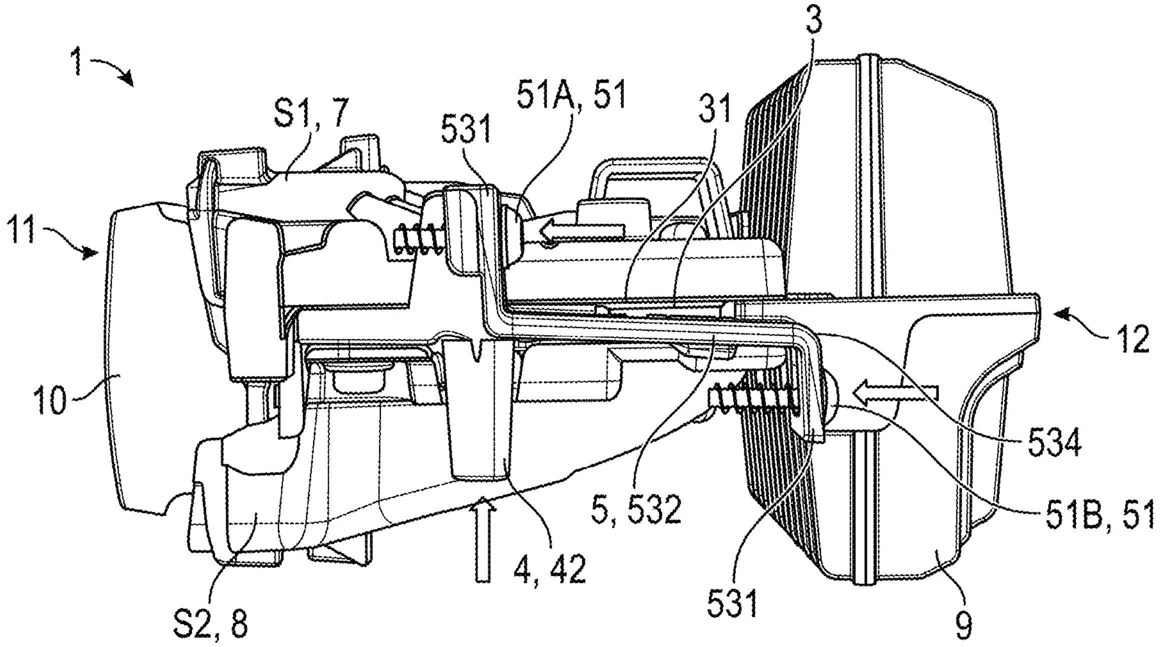
FIG. 8 is a side view of the luminous module in FIG. 5, rendering visible the difference in attachment direction of the different attachment means borne by the luminous module.

For each of the embodiments which will be described, a figure, namely FIG. 4 for the first embodiment and FIG. 8 for the second embodiment, illustrates in a same view, without a fastening plate, the mounting and removal direction of the luminous module for each of the two attachment means, the mounting direction for the first attachment means 4 being materialized by solid arrows, whereas the mounting direction for the second attachment means 5 is materialized by hatched arrows.

The plates 40 and 50 have sleeves 300 forming part of adjustable means for connecting the plates to the housing of the luminous device, these sleeves being intended to receive adjusting screws, the movement of which makes it possible to move the sleeve closer to or further away from the housing of the luminous device and therefore to pivot, where appropriate, the plates, and the luminous module that they are intended to bear.

A more detailed description will now be given of the first attachment means 4 and the associated vertical fastening plate 40, which is notably visible in FIGS. 1 and 2 and which is in this case similar, just like the first attachment means 4, from one embodiment to the other. This vertical fastening plate 40 has substantially an L shape, with a first arm 401 and a second arm 402 visible in FIG. 2. The first arm 401 is disposed facing the second reflector 8, whereas the second arm 402 extends perpendicularly with respect to the first arm 401 and extends facing one of the transverse ends 110, 120 of the luminous module 1.

Each first attachment means 4 permits the fastening of the luminous module 1 to the plate of the first type 40, via the cooperation of a clamping screw 41 with a screw bushing 42, dimensioned to receive the clamping screw 41, and a pierced wall 431 intended to form an in this case vertical abutment wall against which the head of the clamping screw 41 is able to bear when it is screwed into the screw bushing 42. In the illustrated example, the in this case three first attachment means 4 are notably formed by screw bushings 42 produced on the luminous module 1, and more particularly the support 3, and the pierced walls 431 are walls of the fastening plate of the first type 40.

The first attachment means are disposed such that two of them are aligned in the transverse direction and are substantially equidistant from the first and second longitudinal ends 11 and 12 of the luminous module, whereas the third first attachment means is disposed in the vicinity of the second longitudinal end 12.

The first attachment means 4 are thus associated in this case with three clamping screws 41, including a first screw 41A, a second screw 41B and a third screw 41C. These three clamping screws 41A, 41B, 41C pass through the vertical fastening plate 40 that locally forms the mentioned pierced walls 431 and are inserted into the screw bushings 42 integral with the support 3, forming the first attachment means 4 of the luminous module 1, respectively a first bushing 42A, a second bushing 42B and a third bushing 42C, which are notably visible in FIG. 5. The third bushing 42C which receives the third screw 41C is disposed on one fin 93 or between two fins 93 of the radiator 9 according to the embodiment. The first and second bushings 42A, 42B protrude from the support 3, and more particularly from its lower face 32, on either side of the second reflector 8 in the transverse direction.

Figure 2:
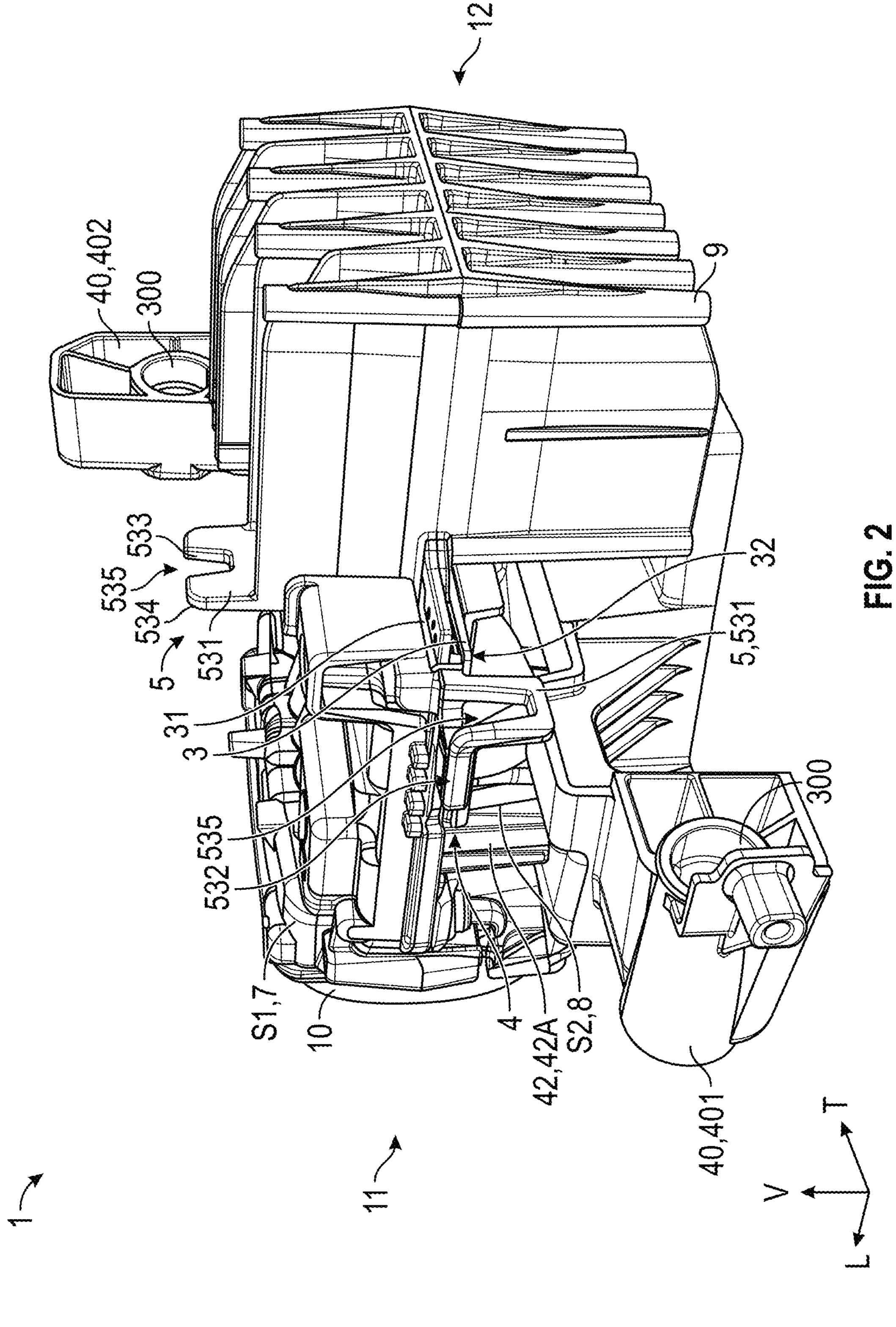
FIG. 2 is a rear perspective view of the luminous module and of the fastening plate of the first type in FIG. 1, FIG. 2 notably rendering visible the means for attaching the luminous module in a first direction and the means for attaching the luminous module in a second direction.

It should be noted at this stage that the first attachment means 4 allow the luminous module 1 to be mounted and removed with respect to the fastening plate of the first type 40, that is to say the vertical fastening plate, this mounting and removal requiring operations of screwing and unscrewing in a vertical direction, as is notably visible in FIGS. 1 and 2.

According to the invention, the luminous module 1 may also be fastened to the luminous device by this time implementing the second attachment means 5, that is to say by preferring a longitudinal mounting and removal direction, via a fastening plate of the second type 50, or in a manner not shown here via a plate common to the first and to the second attachment means.

Figure 3:
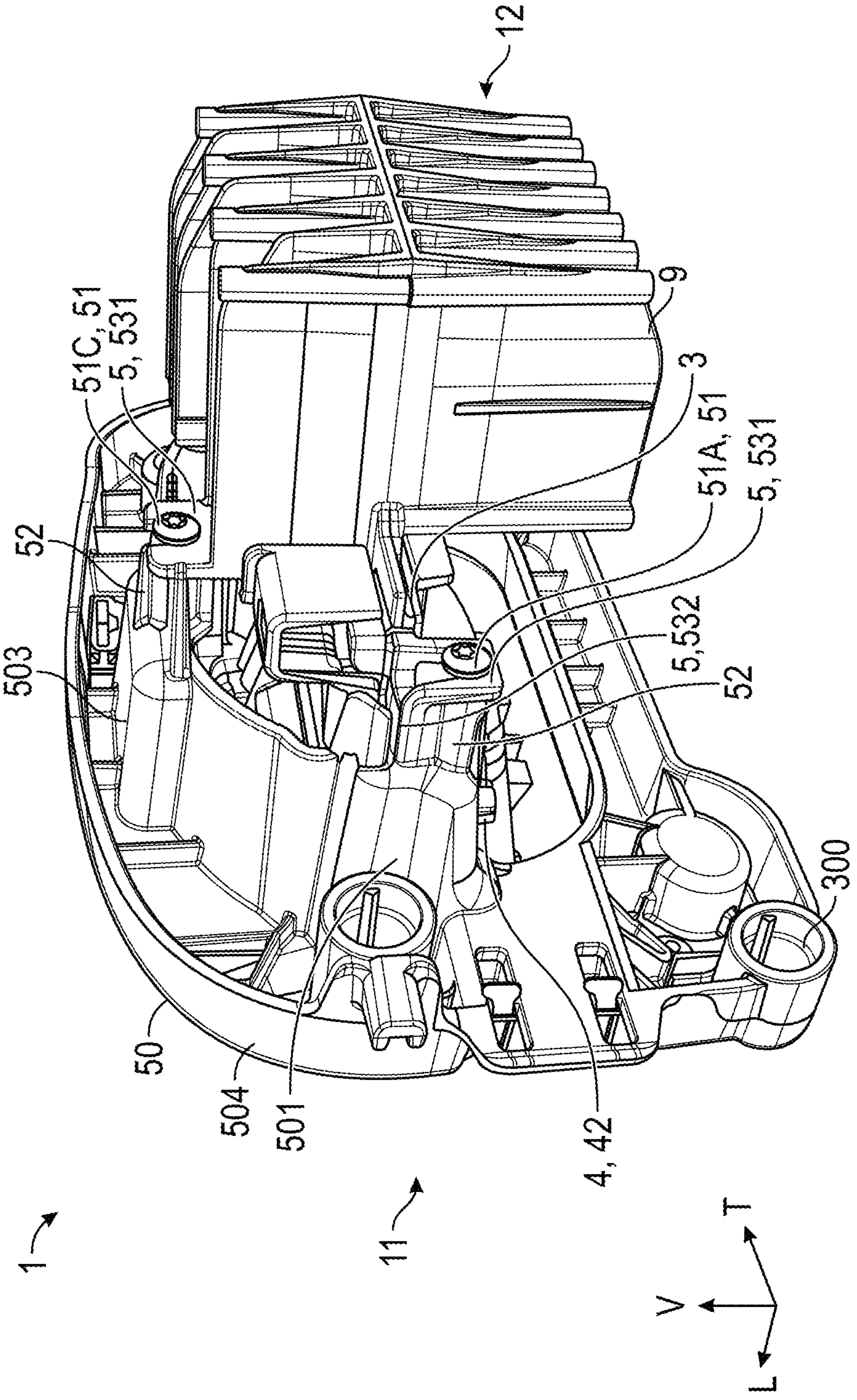
FIG. 3 is a view of the luminous module in FIG. 1, from the same perspective angle as that in FIG. 2, this time with a fastening plate of the second type cooperating with means for attaching the luminous module in the second direction.
Figure 6:
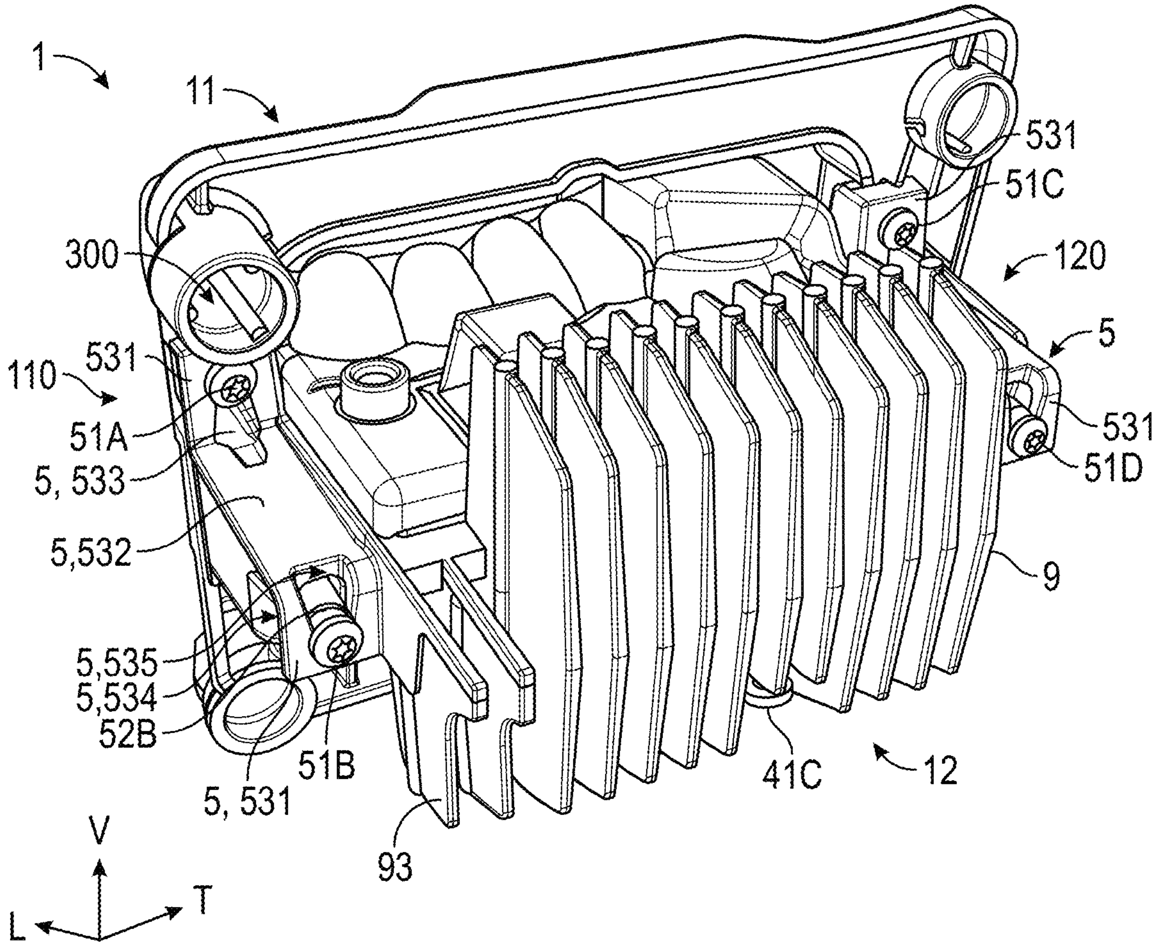
FIG. 6 shows the luminous module in FIG. 5, in a rear perspective view and with an associated fastening plate of a second type, the fastening plate cooperating with the means for attachment in the second direction.

In the case illustrated in the figures, and notably with reference to FIGS. 3 and 6, the fastening plate of the second type, or longitudinal fastening plate 50, has a substantially rectangular frame shape able to surround the luminous module 1.

The longitudinal fastening plate 50 thus comprises a framework 504 and projections associated with the screw bushings. It is thus notable that in the case illustrated in the figures each second attachment means fitted on the luminous module 1 is formed by a pierced wall 531, able to be pressed against a screw bushing 52 present on the fastening plate of the second type 50.

The framework 504 is disposed around the luminous module 1, substantially equidistantly from the two longitudinal ends 11, 12 of this luminous module 1. The number of projections 501, 503 and associated screw bushings 52 is lower than or equal to the number of second attachment means 5, namely three according to the first embodiment shown in FIG. 3, respectively a first projection 501, a second projection not visible in the figures and transversely opposite the first projection and a third projection 503, and two according to the second embodiment shown in FIGS. 5 to 8, respectively the first projection 501 and the second projection not visible in the figures and transversely opposite the first projection 501. These projections 501, 503 extend substantially perpendicularly from the framework 504, i.e. they protrude, in the direction of the second longitudinal end 12 of the luminous module 1 and are extended by a screw bushing 52.

In accordance with the first attachment means 4 described above, each second attachment means 5 permits the fastening of the luminous module 1 to the plate of the second type 50, via the cooperation of a clamping screw 51 with a screw bushing 52, dimensioned to receive the clamping screw 51, and a pierced wall 531 intended to form an in this case longitudinal abutment wall against which the head of the clamping screw 51 is able to bear when it is screwed into the screw bushing 52. In the illustrated example, the second attachment means 5 are notably formed by pierced walls 531 that protrude from the support 3 and that are dimensioned to be passed through by clamping screws 51, which are also received in the screw bushings 52 of the plate of the second type 50, in the region of the projections 501, 503 of the latter.

More particularly, each pierced wall 531 forming the second attachment means 5 extends vertically, facing a free end of a screw bushing 52 protruding from the plate of the second type 50.

The luminous module 1 according to the first embodiment shown in FIG. 3 is equipped with three second attachment means 5, each of these second attachment means 5 cooperating, via a suitable clamping screw 51A, 51C, respectively with the first projection 501, the second projection and the third projection 503. Considering a longitudinal and transverse plane in which the support 3 is primarily inscribed, the first projection 501 and the second projection are disposed on one side of this plane, the side of the lower face 32 of the support 3, whereas the third projection 503 is disposed on the other side of this plane, the side of the upper face 31 of the support 3. This results in an arrangement of the second attachment means 5 on either side of the longitudinal and transverse plane in which the support 3 is primarily inscribed.

Two second attachment means 5 are disposed laterally in the vicinity of the transverse end edges of the support 3 and are disposed facing the first and second projections 501. These two laterally disposed second attachment means 5 comprise a base 532, formed by a wall transversely extending the support 3, and the pierced wall 531 as mentioned above which substantially perpendicularly extends the base.

The third second attachment means 5, disposed substantially equidistantly from the two other second attachment means, comprises a pierced wall 531 which vertically extends consecutive fins 93 of the radiator 9.

Each pierced wall 531 has a slot 533 able to be passed through by the shank of the clamping screw 51A, 51C, and it is notable that each slot opens out onto an upper end edge 534 of the corresponding pierced wall 531, such that each slot can be considered as extending in a vertical direction from a bottom wall of the slot to the upper edge of the pierced wall 531. The clearance 535 formed by the opening-out nature of the slot facilitates the demolding of the support 3, bearing the two types of attachment means in the illustrated example, it being notable that the direction of elongation of the screw bushings 42 of the first attachment means 4 and the direction of extension of the slot 533 formed in the pierced wall 531 of the second attachment means are parallel.

The luminous module according to the second embodiment, shown in FIGS. 5 to 8, is equipped with four second attachment means 5, including a second attachment means which cooperates, via a suitable clamping screw 51B, with the first projection 501 and a second attachment means which cooperates, via a suitable clamping screw 51D, with the second projection. The two remaining second attachment means of the second embodiment are pressed against the framework 504 of the longitudinal fastening plate 50 via a clamping screw 51C, 51D. In accordance with what has been described for the first embodiment, the second attachment means 5 are distributed on either side of the longitudinal and transverse plane in which the support 3 is primarily inscribed, since the two remaining second attachment means, pressed against the framework, are disposed on the side of the upper face 31 of the support 3.

Figure 7:
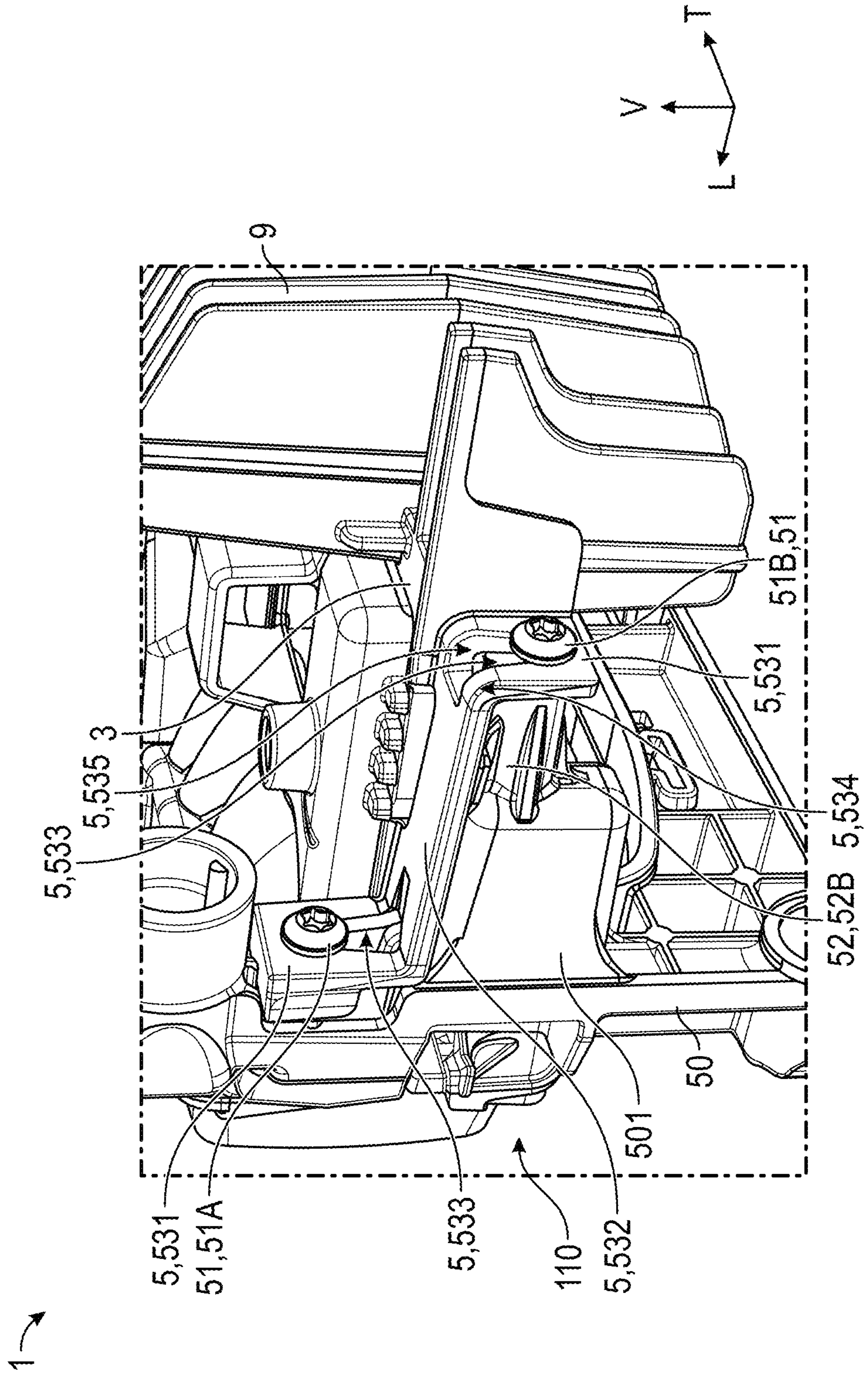
FIG. 7 is a close-up view of FIG. 6, more particularly rendering visible a portion of the means for attaching the luminous module in the second direction cooperating with the fastening plate of a second type.

FIG. 7 more particularly details the configuration of the second attachment means 5 according to this second embodiment. Such a configuration will be described in a detailed manner below for the two second attachment means that are disposed in the vicinity of the first transverse end 110 and that form a pair of second attachment means, it will, however, be understood that the same arrangement is observed for the two second attachment means disposed in the vicinity of the second transverse end 120.

Within a pair of second attachment means 5, each second attachment means 5 comprises, as described above for the first embodiment, a pierced wall 531 equipped with a slot through which a clamping screw 51A is able to pass so as to engage in a screw bushing 52 borne by the fastening plate 50 and so as to clamp the pierced wall 531 between the screw bushing 52 and the screw head.

More particularly, a pair of second attachment means 5 comprises a base 532 disposed in the transverse extension of the support 3 and two pierced walls 531 disposed opposite one another at the longitudinal ends of this base 532. One second attachment means 5 of this pair, forming a primary second attachment means, is formed by a pierced wall 531 that substantially perpendicularly extends the base 532 on the side of the first face 31 of the support 3, and the other second attachment means of this pair, forming a secondary second attachment means, is formed by a pierced wall 531 that substantially perpendicularly extends the base 532 on the side of the second face 32 of the support 3.

It is notable that each pierced wall 531, against which the head of a clamping screw 51A, 51B is intended to bear, has a slot which opens out onto the edge of the pierced wall disposed in the extension of the base 532. This has the result that the slot formed in the primary second attachment means opens out toward the bottom and the slot formed in the secondary second attachment means opens out toward the top. This feature, combined with the arrangement of the second attachment means 5 of the same pair on either side of the plane of elongation of the support, enables a simplified removal of the molds, the parting line of which corresponds to the plane of elongation of the support 3, in opposite directions.

The primary second attachment means is able to cooperate with a primary screw 51A and the secondary second attachment means is able to cooperate with a secondary screw 51B, the primary screw 51A and secondary screw 51B being intended to be inserted into screw bushings 52 configured to receive them, respectively a screw bushing housed in the framework 504 of the fastening plate and a secondary screw bushing 52B, formed by a projection 501 of the fastening plate of the second type 50.

As has been mentioned above, primary and secondary second attachment means equivalent to those which have just been described in the vicinity of the first transverse end 110 form a pair of second attachment means in the vicinity of the second transverse end 120 that are also able to cooperate with a primary screw 51C and a secondary screw 51D.

The present invention, as it has just been described, achieves its stated aim, namely of proposing a luminous module that can be assembled with a luminous device in two different fastening directions, in this case a vertical direction or a longitudinal direction. Such interchangeability notably offers ease of access to the clamping screws, thus facilitating the replacement of the luminous module according to the invention.

The present invention is not, however, limited to the means and configurations described and illustrated here, but also extends to any equivalent means and configuration and to any technically operational combination of such means.

The invention claimed is:

1. A luminous device of a motor vehicle comprising a luminous module and a fastening plate, the luminous module comprising at least one first attachment means configured to fasten the luminous module to the fastening plate in a first direction and at least one second attachment means configured to fasten the luminous module to the fastening plate in a second direction that differs from the first direction, wherein the luminous module comprises a single attachment means, the single attachment means being one of the at least one first attachment means or the at least one second attachment means, the luminous module is fastened to the fastening plate with the single attachment means, and a position of the luminous module relative to the fastening plate is fixed when the luminous module is attached to the fastening plate with the single attachment means.

2. The luminous device as claimed in claim 1, wherein the first direction is perpendicular to the second direction.

3. The luminous device as claimed in claim 1, wherein the first direction is a vertical direction perpendicular to the ground on which the motor vehicle is disposed or the second direction is a longitudinal direction corresponding to the main direction of elongation of the motor vehicle.

4. The luminous device as claimed in claim 1, wherein the luminous module comprises at least three first attachment means or at least three second attachment means, at least two of the first attachment means or at least two of the second attachment means each being disposed in opposition in the vicinity of transverse ends or vertical ends of the luminous module.

5. The luminous device as claimed in claim 1, wherein the luminous module further comprises a continuous part configured to comprise the at least one first attachment means and the at least one second attachment means.

6. The luminous device as claimed in claim 5, wherein said continuous part is a radiator.

7. The luminous device as claimed in claim 1, wherein one of the at least one first attachment means and the at least one second attachment means comprises a screw bushing, configured to receive a clamping screw, and the other comprises a pierced wall configured to be pressed against the screw bushing by way of a head of the clamping screw.

8. The luminous device as claimed in claim 7, wherein the pierced wall forming the other of the attachment means comprises a slot opening out onto an end edge of said pierced wall.

9. The luminous device as claimed in claim 1, further comprising an additional part attached to the luminous module, wherein the luminous module is fastened to the fastening plate by the single attachment means of the at least one first and the at least one second attachment means, and the additional part is attached to the luminous module by the other attachment means of the at least one first and the at least one second attachment means.

10. The luminous device as claimed in claim 2, wherein the luminous module comprises at least three first attachment means or at least three second attachment means, at least two of the first attachment means or at least two of the second attachment means each being disposed in opposition in the vicinity of transverse ends or vertical ends of the luminous module.

11. The luminous device as claimed in claim 2, wherein the luminous module further comprises a continuous part configured to comprise the least one first attachment means and the at least one second attachment means.

12. The luminous device as claimed in claim 2, wherein one of the at least one first attachment means and the at least one second attachment means is formed by a screw bushing, configured to receive a clamping screw, and the other is formed by a pierced wall configured to be pressed against the screw bushing by way of a head of the clamping screw.

13. The luminous device as claimed in claim 2, wherein the first direction is a vertical direction perpendicular to the ground on which the motor vehicle is disposed or the second direction is a longitudinal direction corresponding to the main direction of elongation of the motor vehicle.

14. The luminous device as claimed in claim 2, comprising at least three first attachment means or at least three second attachment means, at least two of the first attachment means or at least two of the second attachment means each being disposed in opposition in the vicinity of transverse ends or vertical ends of the luminous module.

15. The luminous device as claimed in claim 2, wherein the luminous module further comprises a continuous part configured to comprise the least one first attachment means and the at least one second attachment means.

* * * * *